United States Patent [19]
Narendran

[11] Patent Number: 5,436,988
[45] Date of Patent: Jul. 25, 1995

[54] OPTICAL SLIP RING

[75] Inventor: Nadarajah Narendran, Clifton Park, N.Y.

[73] Assignee: Mechanical Technology Inc., Latham, N.Y.

[21] Appl. No.: 180,620

[22] Filed: Jan. 13, 1994

[51] Int. Cl.⁶ ............................................. G02B 6/36
[52] U.S. Cl. ...................... 385/26; 385/12; 385/25
[58] Field of Search ............... 385/26, 25, 12; 250/227.14, 227.19; 356/350

[56] References Cited

U.S. PATENT DOCUMENTS

| | | | |
|---|---|---|---|
| 4,900,117 | 2/1990 | Chen | 385/26 |
| 4,953,932 | 9/1990 | Mihich | 385/26 |
| 4,958,904 | 9/1990 | Rawski | 395/26 |
| 5,044,749 | 9/1991 | Califano | 356/350 X |
| 5,157,745 | 10/1992 | Ames | 385/26 |
| 5,202,939 | 1/1993 | Belleville | 385/12 |

OTHER PUBLICATIONS

Performance of a fiber-optic temperature sensor from-200 to 1050 C, Lee et al, Optic Letters, vol. 13 No. 11, Nov. 1988, pp. 1038-1040.

*Primary Examiner*—Rodney B. Bovernick
*Assistant Examiner*—Hemang Sunghavi
*Attorney, Agent, or Firm*—Kane, Dalsimer, Sullivan, Kurucz, Levy, Eisele & Richard

[57] ABSTRACT

An optical slip ring for acting as an interface between rotary member and a stationary detector includes a source for generating a light beam directed at a sensor on the rotary member and an optical fiber transmitting said beam to the sensor. The sensor generates in response a sensor signal indicative of a physical parameter of interest. This sensor signal is transmitted through the fiber to an output lens for pick up by a stationary detector.

19 Claims, 2 Drawing Sheets

OPTICAL SLIP RING

BACKGROUND OF THE INVENTION

1. Field of Invention

This invention pertains to a device for exchanging optical signals between a stationary and a moving object, and more particularly for exchanging signal with a rotary member such as shaft.

2. Description of the Prior Art

Most industrial and power plants include rotary equipment which is subjected to large loads. Because the rotary equipment is a crucial element in these plants, it is desirable to monitor it so that potential failures due to temperature, strain and stress can be sensed before a catastrophic breakdown of the equipment occurs. Traditionally electro-mechanical and electronic sensors were utilized to this purpose which were mounted on the rotary equipment and coupled to stationary detection equipment through mechanical slip rings, or some electronic means.

Recently sensors have been developed which can detect high temperature, strain or stress levels using optical fibers and related devices. However these devices could not be installed on rotating equipment for a lack of a suitable interface.

OBJECTIVES AND SUMMARY OF THE INVENTION

An objective of the present invention is to provide an optical slip ring to function as an interface between a sensor disposed on a rotary member and a stationary detector used to analyze the output of the sensor.

A further objective is to provide a slip ring which can be particularly useful in conjunction with fiber optic technology.

Yet a further objective is to provide a slip ring which can be used on existing rotary equipment without major modifications.

Other objectives and advantages of the invention shall become apparent from the following description. Briefly, an optical slip ring constructed in accordance with this invention includes a receiving lens disposed on a rotary member, and an annular light source disposed about the rotary member for generating light continuously to said receiving lens. The rotary member also has at least one sensor for monitoring a physical parameter of said member such as temperature, strain, stress and so on. The sensor is coupled to the receiving lens for example by an optical fiber and generates in response to said light a sensor beam indicative of the respective parameter. The sensor beam is propagated from the rotary member to a stationary detector for analysis. In one embodiment, the incoming beam and outgoing sensor beam travel in the optical fiber in opposite direction. A beam splitter is used to separate the input beam from the sensor beam. In another embodiment an output lens is used to transmit the sensor signal to a stationary detector. In either embodiment, the light from the source is focused onto the input lens by an annular ring.

DETAILED DESCRIPTION OF THE INVENTION

Figure 1:
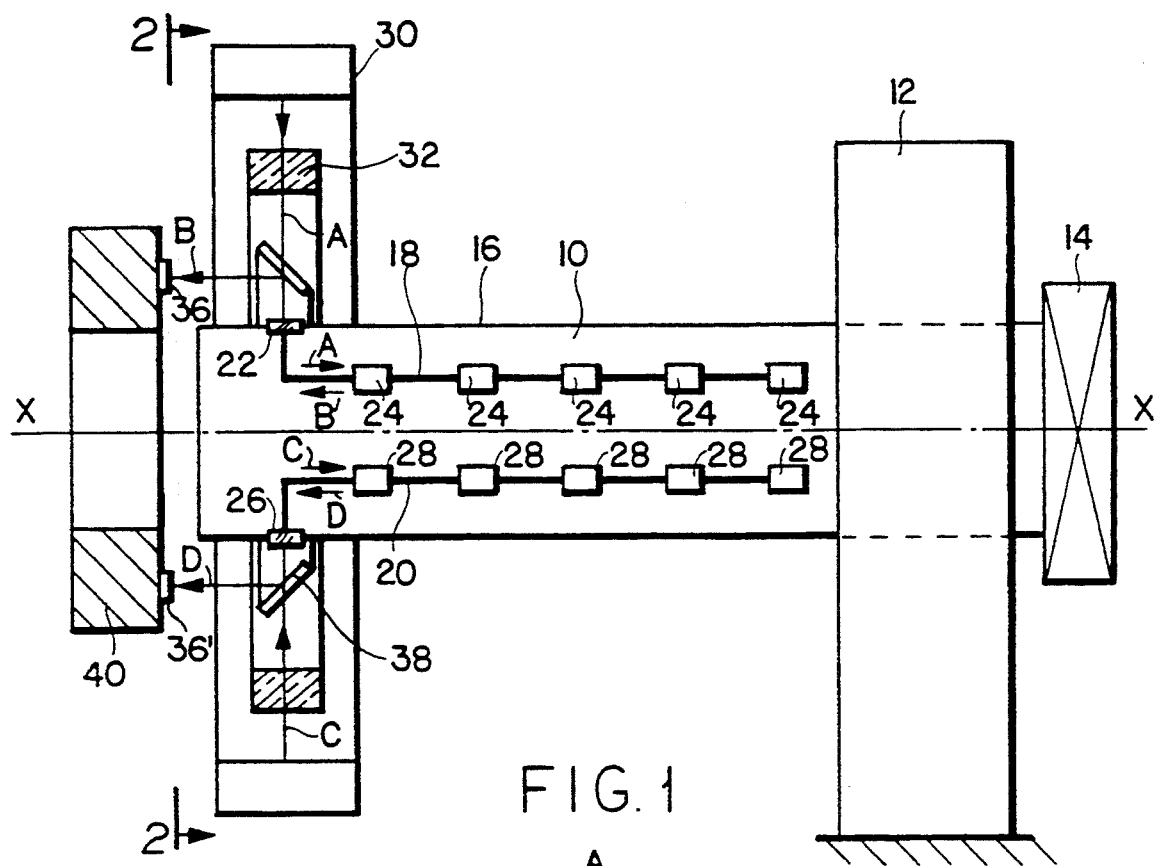
FIG. 1 shows an elevational view of an optical slip ring constructed in accordance with this invention.

Referring now to FIG. 1, a shaft 10 is rotatable mounted on a stationary frame 12. The shaft 10 may be a driven member in which case it is coupled for rotation to a motor shown somewhat schematically by 14. Shaft 10 may be supported by other additional support means which have been omitted for the sake of clarity. Shaft 10 has a cylindrical surface 16. Secured to this surface are one or more optical fibers. FIG. 1 shows two such fibers 18, 20.

Optical fiber 18 has one end connected to a GRIN lens 22. From lens 22 fiber 18 runs to a plurality of sensors 24 attached to or embedded into shaft 10, generally in parallel with the longitudinal shaft axis X—X. Similarly fiber 20 runs from a GRIN lens 26 to a plurality of sensors 28 as shown. Each of the fibers 18, 20 may comprise a single strand in which case the output of the sensors are combined or multiplexed on a single fiber, (As described for example in co-pending application Ser. No. 08/180,619 alternatively, fibers 18, 20 may comprise several strands, one for each sensor 24, 28. The sensors 24, 28 are constructed and arranged to sense one or more local physical parameters of the shaft such as temperature, stain, stress, and so on.

Figure 2:
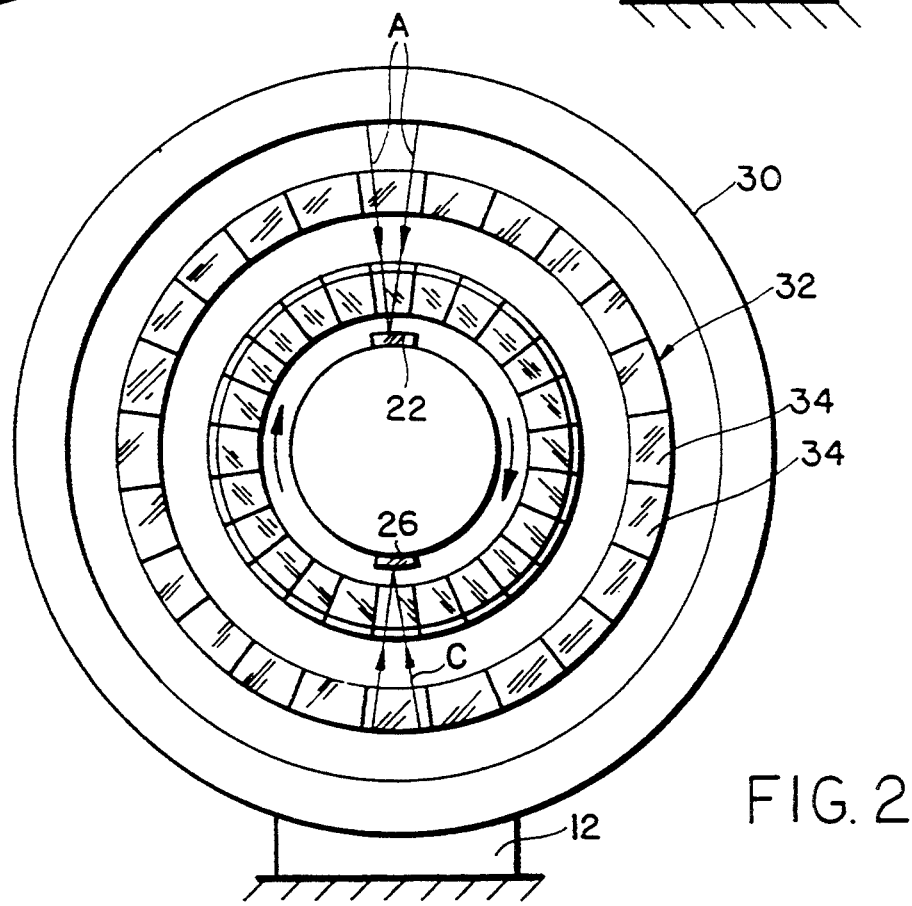
FIG. 2 shows an end side view of the slip ring of FIG. 1.

Disposed about shaft 10, is an annular light source 30 constructed and arranged to generate a high intensity light beam such as a laser beam radially inward toward shaft 10. An annular lens arrangement 32 is disposed radially inwardly of source 30 and arranged to focuses the beam generated by source 30 onto the surface 16 and more importantly onto GRIN lenses 22, 26. Lens arrangement 32 can be formed of a plurality of lens segments 34 coupled side by side to form the annular shape as shown in FIG. 2. Alternatively lens arrangement 32 may consist of a Fresnel lens ground to the required shape.

The light beams from the lens 32 pass through a beam splitter 38 which may be for example a partially coated frustoconical mirror, before striking the surface 16 and more importantly GRIN lenses 22, 26. As the GRIN lens 22 rotates about axis X—X it continuously receives light from source 30 and lens 32. For example in FIG. 2 when the lens 22 is in its topmost position it receives a light beam A. This light is injected into fiber 18. As this light beam enters each of the sensors 24, a reflective beam B is generate indicative of the physical parameter being measured by a particular sensor 24. The reflective beam B is propagated through fiber 18 back to lens 22 and is transmitted towards beam splitter 34 which reflects it toward one of a plurality of light detectors, such as 36. These detectors are arranged in annular pattern concentric with axis X—X on a stationary frame 40.

Similarly lens 26 receives a beam C which is propagated through fiber 20 to sensors 28. Each of the corresponding beams D travel back to lens 26 where it is transmitted to splitter 34 and another detector 36'.

In this manner, as the shaft 10 is rotating about axis X—X, the fibers 18, 20 continuously receive light and the sensors 24, 28 generate corresponding indicative reflective beams which are transmitted back through the fibers 18, 20, exit through lenses 22, 26 and are detected by the detectors such as 36, 36'.

Figure 3:
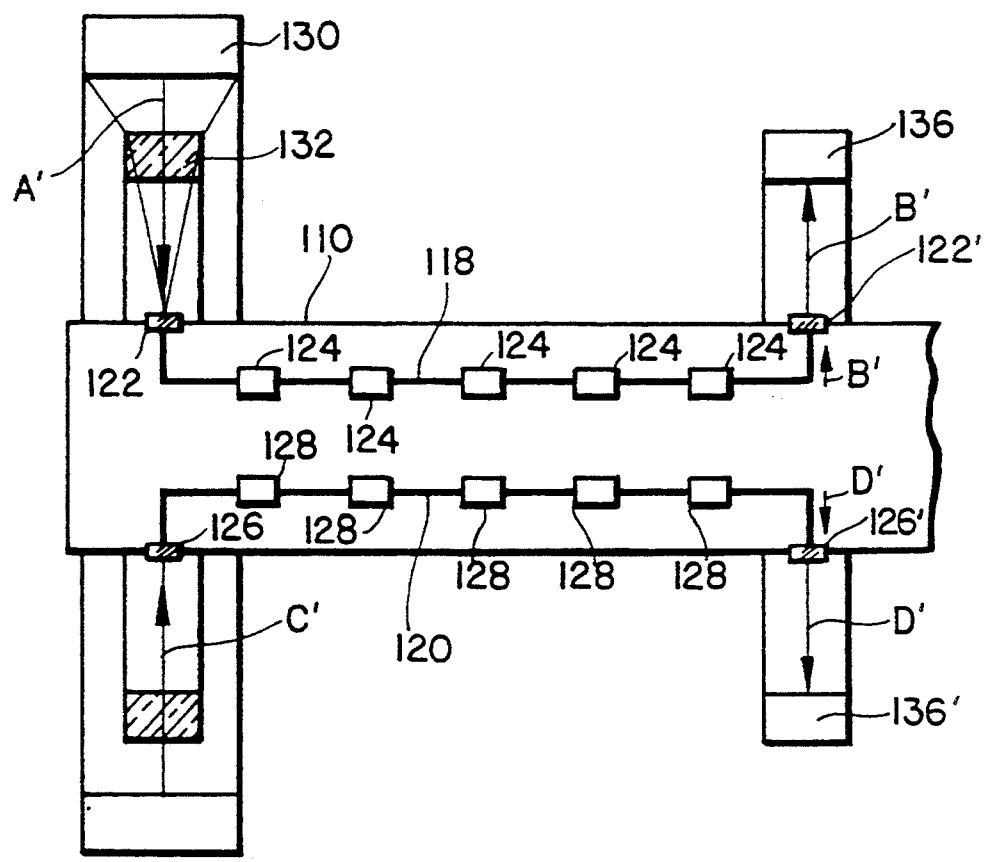
FIG. 3 shows a side elevational view of an alternate embodiment of the invention.

An alternate embodiment is shown in FIG. 3. In this embodiment, shaft 110 is also provided with a plurality of fibers such as 118, 120 connecting GRIN lenses 122, 126 to respective sensors 124, 128. As they rotate, these fibers 118, 120 also receive continuously light from a source 130 through a lens 132.

However in this embodiment, the fibers 118, 120 terminate in set of secondary GRIN lenses 122', 126'. Responsive to beams, A', C'. The sensors 124, 126 generate sensor beams B', D' coincident with beams A', C'. These beams B', D' exit through lenses 122', 126' respectively and are intercepted by a set of stationary detectors 136, 136' disposed in an annular pattern about the same as shown. In this embodiment a beam splitter is not required.

Both embodiments provide optical slip rings which are ideally suited for exchange of optical signals very efficiently and without any moving parts. Thus they provide an ideal optical interface for use with optical fibers and sensors associated therewith. These optical fibers and associated devices are inherently superior to electronic or eletromechanical sensors since they are more immune to electrical noise, and ground currents. Optical fibers can survive at high temperatures. This is not the same as immune to temperature variations.

Obviously numerous modifications may be made to this invention without departing from its scope as defined below.

I claim:

1. An optical slip ring for exchanging optical signals with a rotary member, said optical slip ring comprising:
   a lens mounted on said rotary member;
   an optical fiber coupled to a sensor, said optical fiber and sensor being mounted on said rotary member, and said sensor generating a sensor signal through said fiber to said lens;
   a plurality of detectors disposed annularly about said rotary member for receiving said sensor signal; and
   a circumferential light source for generating an input light beam, said light beam directed radially inwardly with respect to the rotary member into said fiber whereby said sensor receives said input light beam from said circumferential light source throughout a rotation of said rotary member, said sensor generating said sensor signal in response to said input light beam.

2. The slip ring of claim 1 wherein said light beam is injected into said fiber through said lens.

3. The slip ring of claim 2 further comprising an annular lens positioned and arranged for focusing said light beam on said lens.

4. The slip ring of claim 2 further comprising a beam splitter for splitting said input and said sensor beams.

5. A light detector assembly comprising:
   a rotary member having an axis, said member rotating about said axis;
   a light source disposed circumferentially about said rotary member for radially inwardly directing an input beam toward said rotary member;
   an optical fiber assembly mounted on said rotary member, said optical fiber assembly including an input lens for receiving said input beam throughout an entire rotation of the rotary member, and a sensor, said sensor receiving said input beam from said lens and generating in response a sensor beam; and
   stationary detector means for detecting said sensor beam.

6. The detector assembly of claim 5 further comprising an annular lens disposed between said rotary member and said light source for focusing said input beams on said lens.

7. The sensor assembly of claim 5 wherein said sensor signal propagates through said fiber coincident with and opposite to said input beams, and further comprising beam splitting means of splitting said input and said sensor beams.

8. The sensor assembly of claim 7 wherein said beam splitting means is stationary.

9. The sensor of claim 8 wherein said beam splitting means is partially coated frustoconical mirror.

10. The sensor assembly of claim 5 wherein said optical fiber assembly further includes an output lens receiving said sensor lens, and said detector means is positioned to receive said sensor signal from said output lens.

11. The detector assembly of claim 10 wherein said detector means includes a plurality of detectors disposed annularly about said rotary member.

12. The detector assembly of claim 5 wherein said optical fiber assembly includes a plurality of sensors.

13. The assembly of claim 12 wherein said sensors are spaced at a predetermined distance from each other.

14. A method of detecting a physical parameter of a rotary member comprising:
   providing an optical fiber associated with a sensor on said rotary member;
   directing an input beam radially inwardly from a circumferential stationary source to said optical fiber throughout an entire rotation of the rotary member;
   generating a sensor signal from said sensor indicative of said physical parameter in response to said input beam; and
   detecting said sensor signal using a stationary detector.

15. The method of claim 14 wherein said optical fiber is coupled to a first interface lens mounted on said rotary member and wherein said light beam is directed to said fiber through said first interface lens.

16. The method of claim 15 wherein said sensor signal is detected through said first interface lens.

17. The method of claim 16 wherein said sensor signal and said input beam are coincident, further comprising the step of splitting said sensor signal form said input beam.

18. The method of claim 15 wherein said optical fiber is coupled to a second interface lens and wherein said sensor signal is detected through said second interface lens.

19. The sensor of claim 14 wherein said input beam is directed into said optical fiber continuously as said optical fiber rotates with said rotary member.

* * * * *